United States Patent
Sze et al.

(10) Patent No.: US 11,588,743 B2
(45) Date of Patent: *Feb. 21, 2023

(54) DEVICE AND METHOD FOR CHARACTERIZATION AND OPTIMIZATION OF MULTIPLE SIMULTANEOUS REAL-TIME DATA CONNECTIONS

(71) Applicant: DEJERO LABS INC., Waterloo (CA)

(72) Inventors: David Sze, Waterloo (CA); Bogdan Frusina, Kitchener (CA); Barry Gilhuly, Waterloo (CA); Todd Schneider, Waterloo (CA)

(73) Assignee: DEJERO LABS INC., Waterloo (CA)

( * ) Notice: Subject to any disclaimer, the term of this patent is extended or adjusted under 35 U.S.C. 154(b) by 126 days.

This patent is subject to a terminal disclaimer.

(21) Appl. No.: 17/127,508

(22) Filed: Dec. 18, 2020

(65) Prior Publication Data
US 2021/0152485 A1 May 20, 2021

Related U.S. Application Data

(63) Continuation of application No. 16/379,158, filed on Apr. 9, 2019, now Pat. No. 10,904,153, which is a (Continued)

(51) Int. Cl.
*H04W 28/02* (2009.01)
*H04L 47/283* (2022.01)
(Continued)

(52) U.S. Cl.
CPC ........ *H04L 47/283* (2013.01); *H04L 43/0829* (2013.01); *H04L 43/0852* (2013.01);
(Continued)

(58) Field of Classification Search
CPC . H04L 43/0829; H04L 43/0852; H04L 47/18; H04L 47/283; H04L 47/41; H04W 28/02; H04W 28/10; H04W 56/001
See application file for complete search history.

(56) References Cited

U.S. PATENT DOCUMENTS

| | | |
|---|---|---|
| 7,076,556 B1 | 7/2006 | Brock et al. |
| 7,596,612 B1 | 9/2009 | Islam et al. |

(Continued)

OTHER PUBLICATIONS

Australian Examination Report received in Australian Application No. 2017221833, dated Nov. 19, 2018.
(Continued)

*Primary Examiner* — Minh Trang T Nguyen
(74) *Attorney, Agent, or Firm* — Norton Rose Fulbright Canada LLP

(57) ABSTRACT

A computer implemented system is provided for improving performance of transmission in real-time or near real-time applications from at least one transmitter unit to at least one receiver unit. The system includes an intelligent data connection manager utility that generates or accesses performance data for two or more data connections associated with the two or more communication networks, and based on the current performance data determining current network transmission characteristics associated the two or more data connections, and bonds the two or more data connections based on: a predetermined system latency requirement; and dynamically allocating different functions associated with data transmission between the two or more data connections based on their respective current network transmission characteristics. The data connection manager utility then manages dynamically the transmission of relatively large data sets across the two or more bonded or aggregated data connections in a way that meets the system latency requirement and improves performance in regards to other network performance criteria (including data transfer rate, errors, and/or packet loss). Related computer implemented methods are also provided.

20 Claims, 13 Drawing Sheets

Bonded connections between transmitter and receiver

Related U.S. Application Data continuation of application No. 15/651,050, filed on Jul. 17, 2017, now Pat. No. 10,298,507, which is a continuation of application No. 15/142,073, filed on Apr. 29, 2016, now Pat. No. 9,736,079, which is a continuation of application No. 14/360,372, filed as application No. PCT/CA2013/000763 on Sep. 6, 2013, now Pat. No. 9,357,427.

(60) Provisional application No. 61/698,082, filed on Sep. 7, 2012.

(51) Int. Cl.
| | |
|---|---|
| *H04W 28/10* | (2009.01) |
| *H04L 47/41* | (2022.01) |
| *H04L 43/0829* | (2022.01) |
| *H04L 43/0852* | (2022.01) |
| *H04L 47/10* | (2022.01) |
| *H04W 56/00* | (2009.01) |

(52) U.S. Cl.
CPC .............. *H04L 47/18* (2013.01); *H04L 47/41* (2013.01); *H04W 28/02* (2013.01); *H04W 28/10* (2013.01); *H04W 56/001* (2013.01)

(56) References Cited

U.S. PATENT DOCUMENTS

| | | | | |
|---|---|---|---|---|
| 7,653,730 | B1 | 1/2010 | Hoffman et al. | |
| 9,357,427 | B2 | 5/2016 | Sze | H04W 28/10 |
| 9,736,079 | B2 | 8/2017 | Sze | H04W 28/10 |
| 10,298,507 | B2 | 5/2019 | Sze | H04W 28/10 |
| 10,904,153 | B2 * | 1/2021 | Sze | H04W 28/02 |
| 2005/0243857 | A1 | 11/2005 | Hofstaedter et al. | |
| 2006/0026017 | A1 | 2/2006 | Walker | |
| 2008/0219281 | A1 | 9/2008 | Akin et al. | |
| 2009/0245114 | A1 | 10/2009 | Vijayaraghavan | |
| 2009/0296703 | A1 | 12/2009 | Peng | |
| 2010/0115048 | A1 | 5/2010 | Scahill | |
| 2011/0075557 | A1 | 3/2011 | Chowdhury | |
| 2011/0116373 | A1 | 5/2011 | Lauer | |
| 2012/0008496 | A1 | 1/2012 | Saavedra | |
| 2012/0182864 | A1 | 7/2012 | Heinz et al. | |
| 2014/0337473 | A1 | 11/2014 | Frusina | |

OTHER PUBLICATIONS

European Patent Office, Extended European Search Report dated Mar. 30, 2016 in respect of EP Application No. 13834857.8-1857.
WIPO, International Search Report and Written Opinion dated Dec. 17, 2013 in respect of PCT Application No. PCT/CA2013/000763.
IP Australia, Patent Examination Report No. 1 dated Jun. 30, 2016 in respect of AU Application No. 2013312966.
European Patent Office, European Search Report against EP Application No. 19211624.2, dated Mar. 10, 2020.
European Patent Office, Extended European Search Report dated Mar. 30, 2016, issued in European Patent Application No. 13834857.8-1857.
Patent Cooperation Treaty Office, International Search Report and Written Opinion dated Dec. 17, 2013, issued on PCT Application No. PCT/CA2013/000763.
IP Australia, Patent Examination Report No. 1, dated Jun. 30, 2016 issued in Australia Patent Application No. 2013312966.
European Patent Office, Extended European Search Report for Application No. 13834857.8 dated Mar. 30, 2016.

* cited by examiner

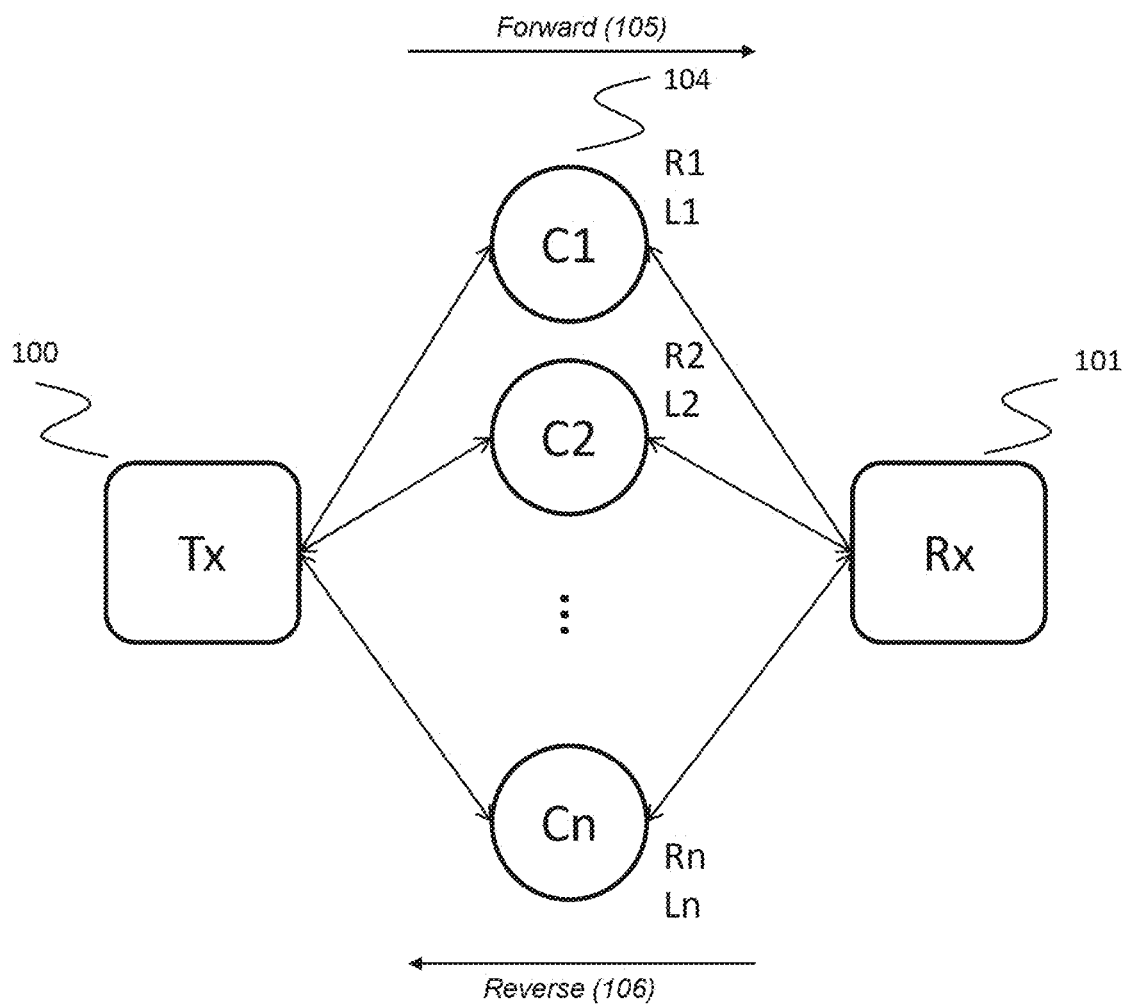
Figure 1. Bonded connections between transmitter and receiver

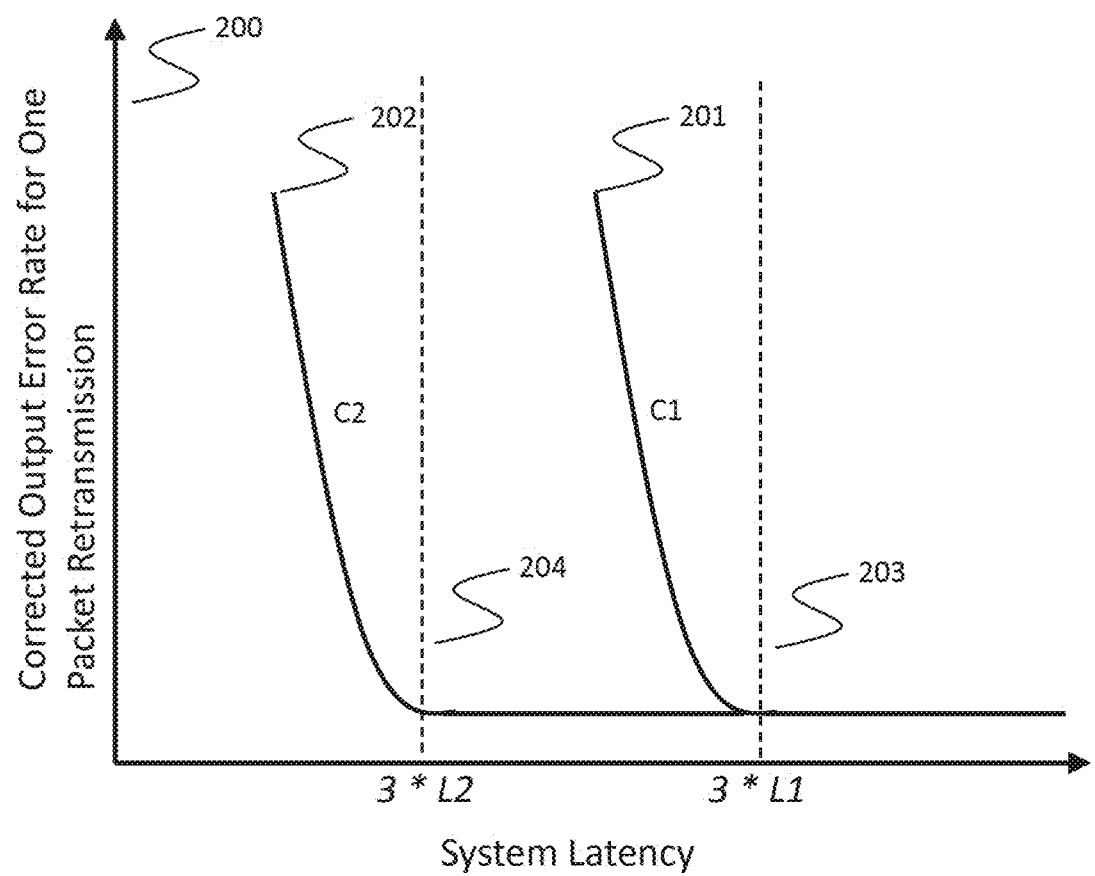
Figure 2. Latency versus Output Error Rate for Typical Connections

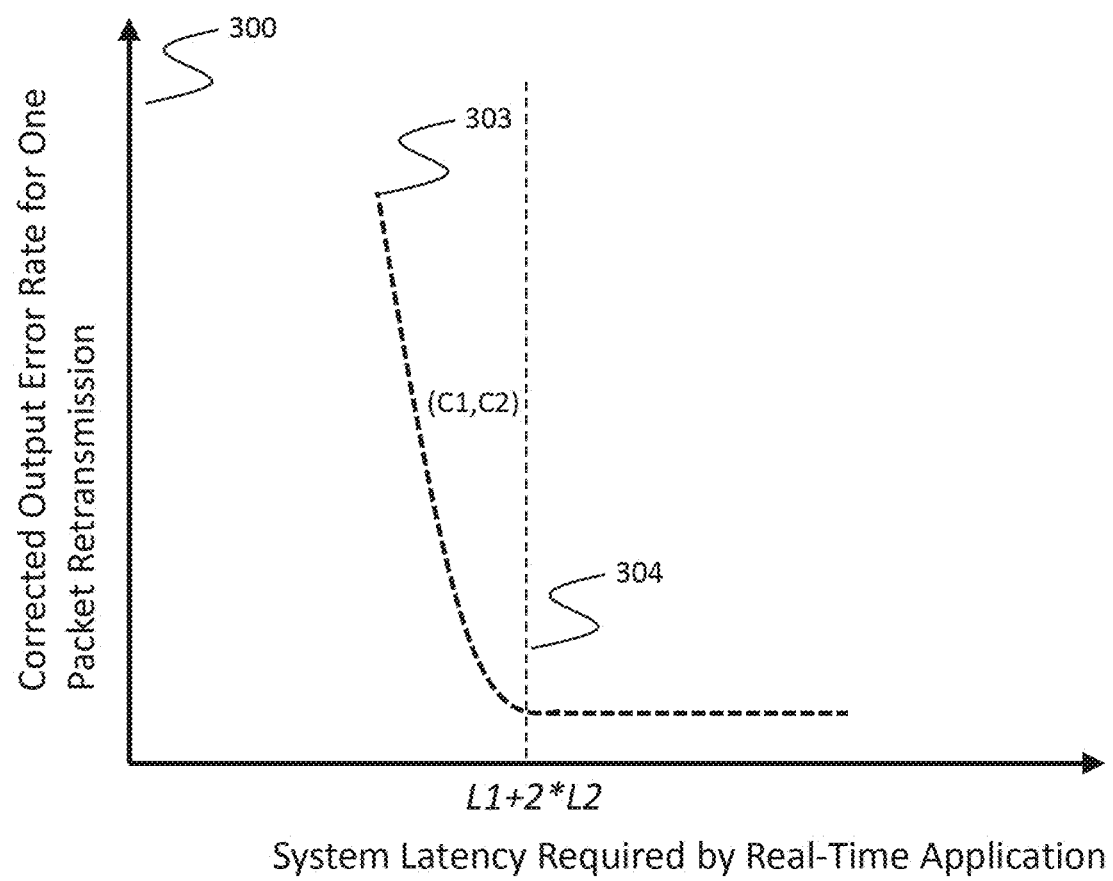
Figure 3. Combined Latency versus Output Error Rate

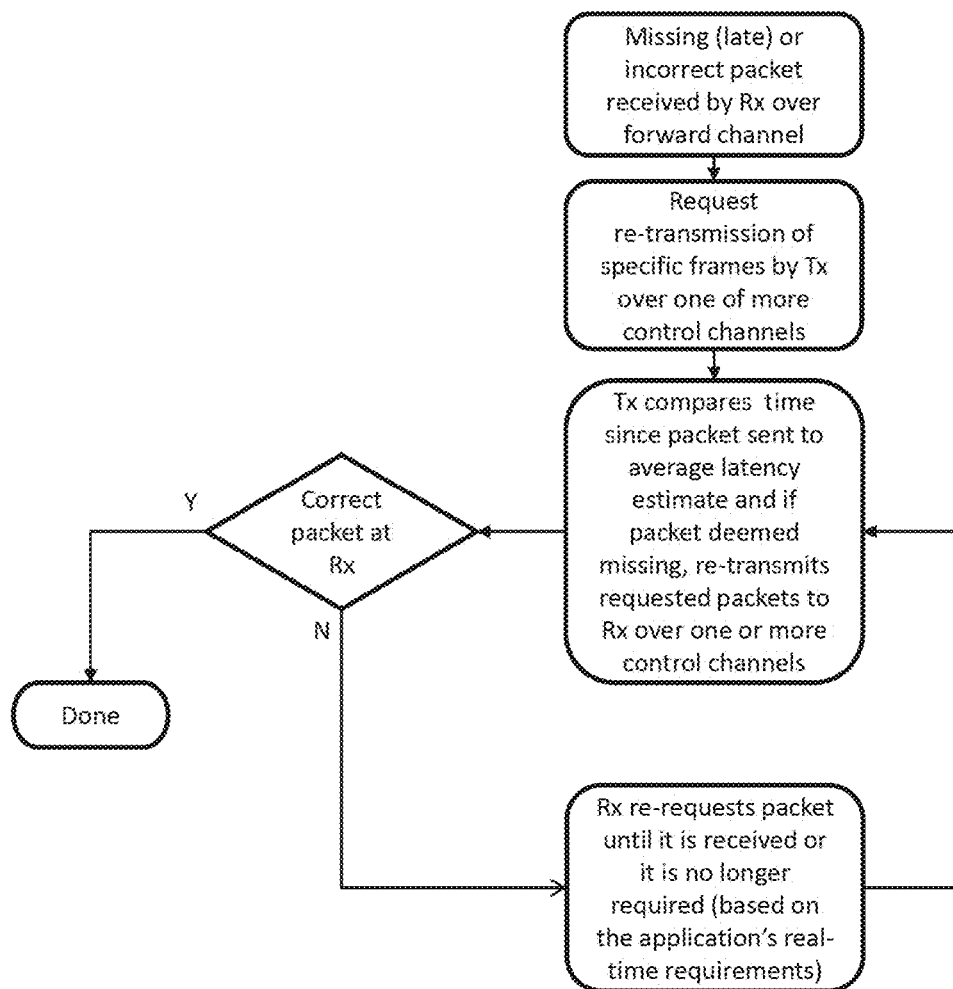
Figure 4. Error Correction via Packet Re-transmission

| Example | Use | Network Latency | Data Rate | Packet Loss | Cost |
|---|---|---|---|---|---|
| Satellite | "Primary Data Transmission" | High | High | Depends on transmit conditions but can be high | Low to Medium (depends on provider) |
| Cellular | "Control and Error Correction" or "Primary Data Transmission" | Medium | 4G/LTE – High 3G – Medium | Depends on network conditions and transmitter location | Low to High (depends on region and carrier) |
| Leased Line | "Control and Error Correction" | Low | Medium High | Low | Medium to High (depends on speed) |
| Public Internet | "Primary Data Transmission" | Medium | Medium to High | Low to Medium | Low |

Figure 5. Typical Characteristics for Different Connection Types

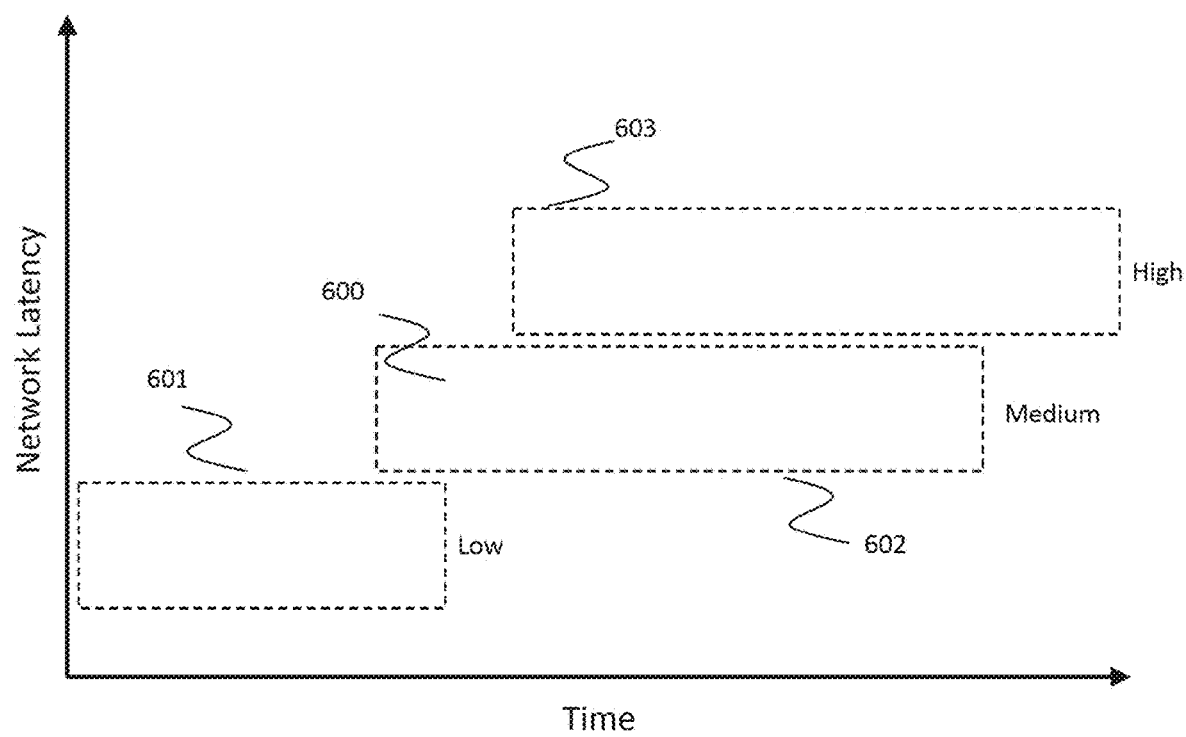
Figure 6. Example of Categorization Based on Network Latency

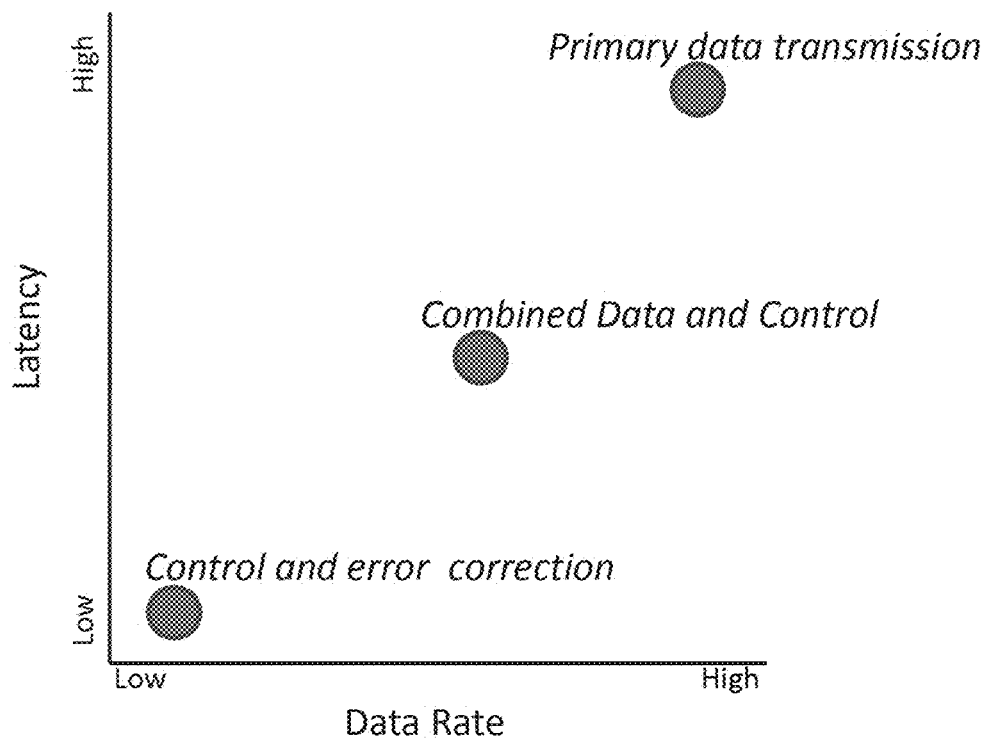
Figure 7a. Example of Categorization of Connections by Latency

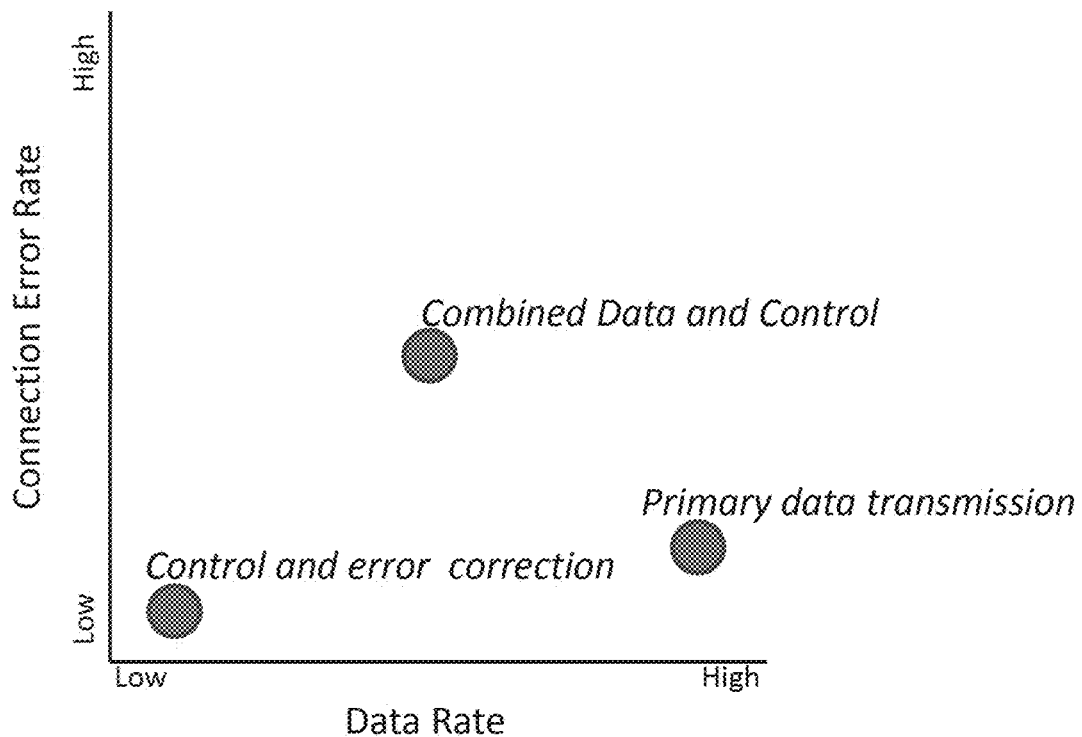
Figure 7b. Example of Categorization of Connections by Error Rate

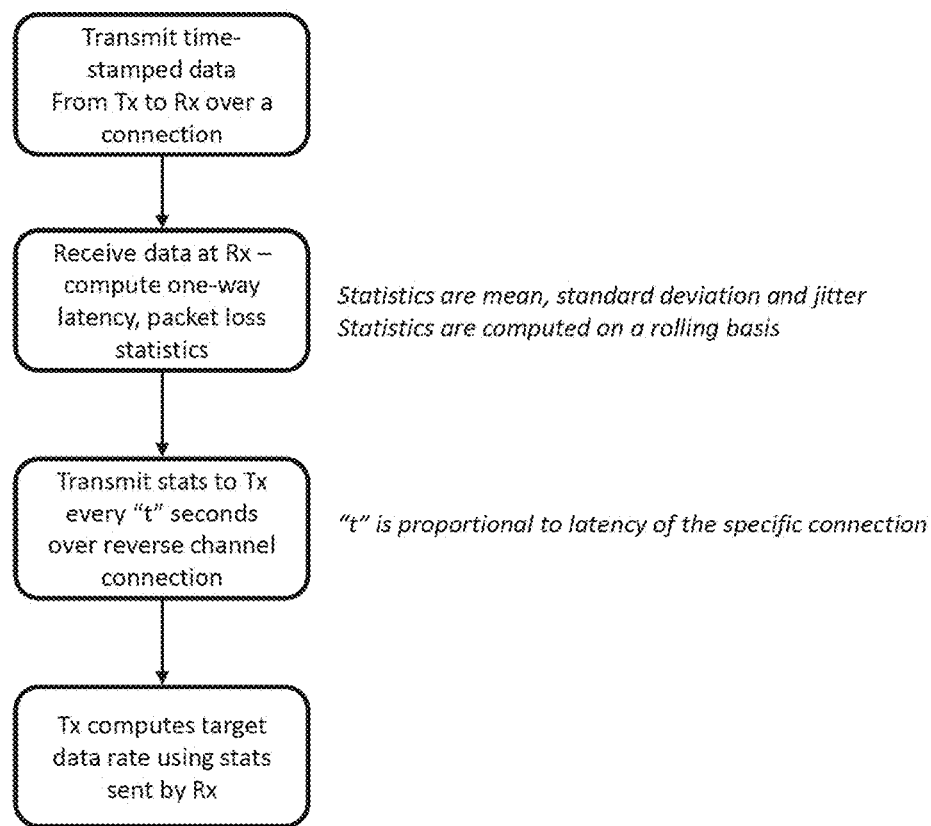
Figure 8. Computation of Connection Characteristics

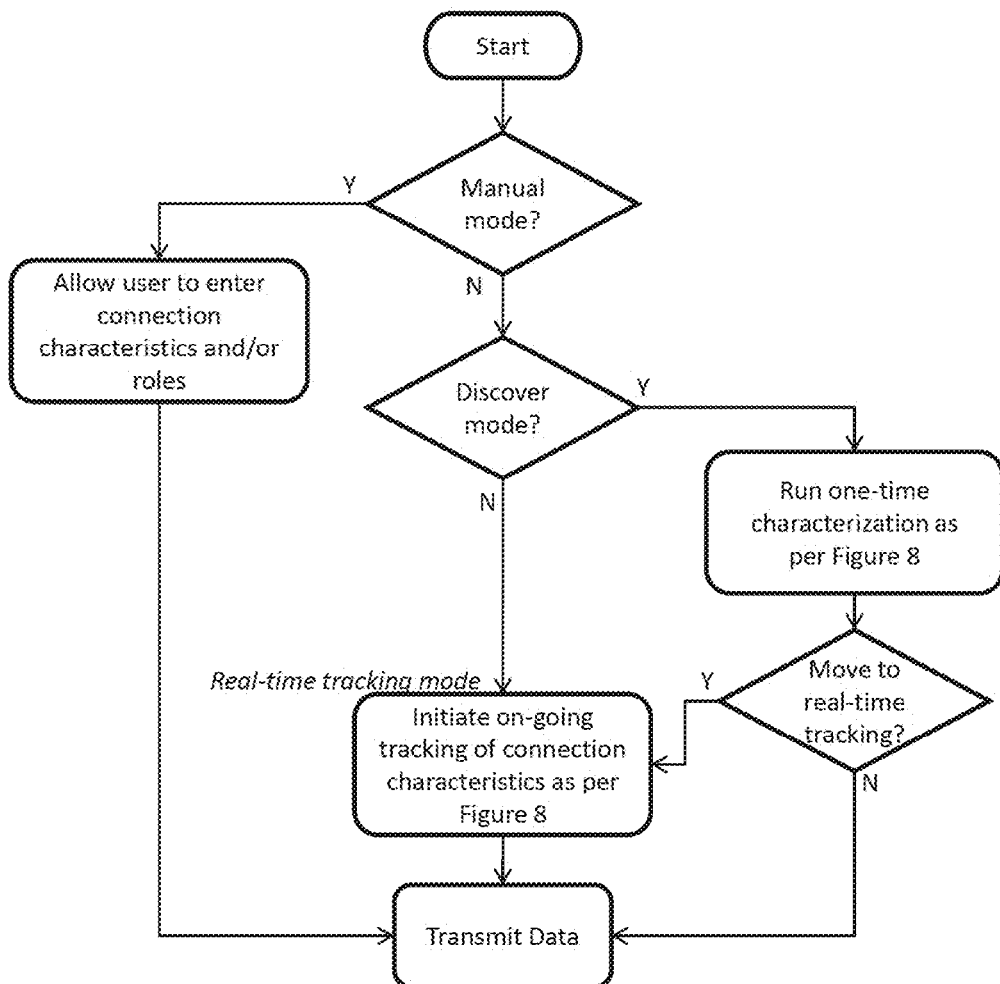
Figure 9. Connection Characterization Modes

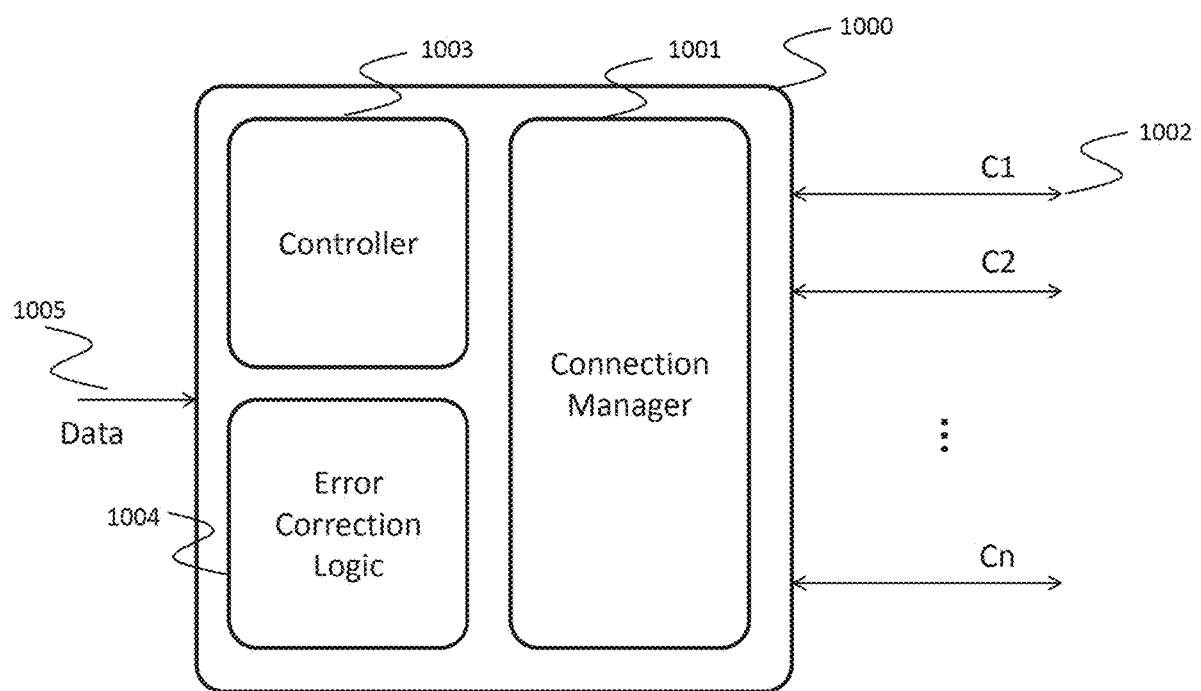
Figure 10. Transmitter Block Diagram

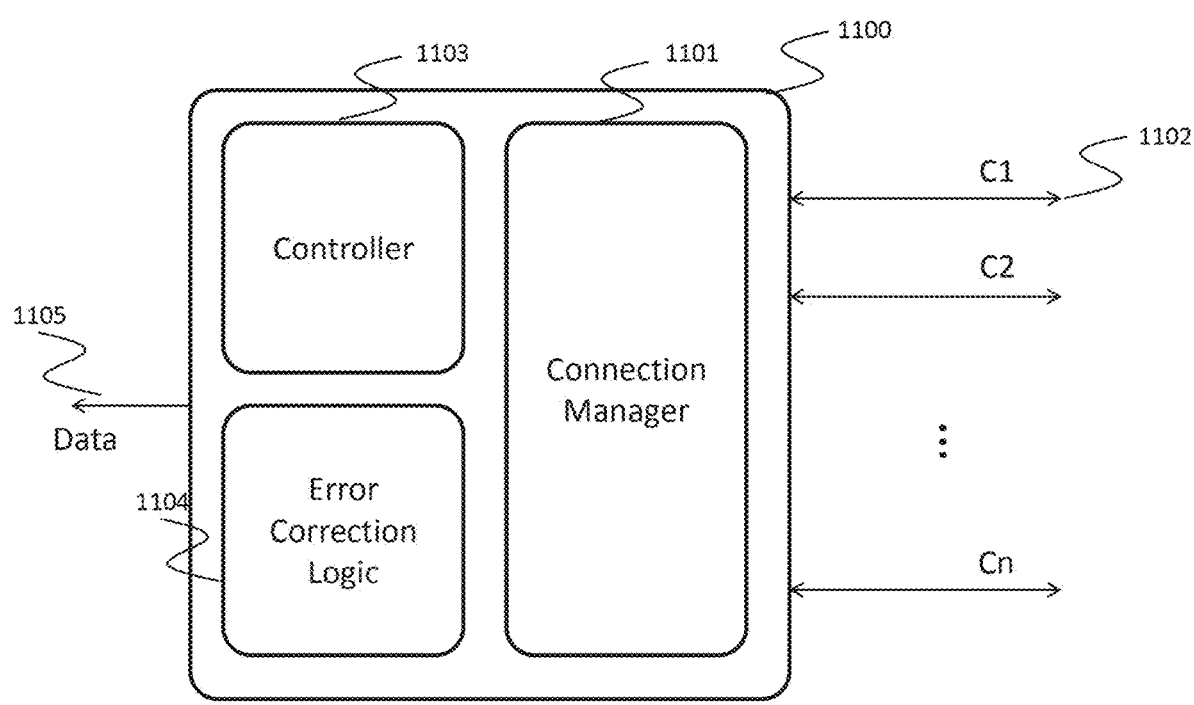
Figure 11. Receiver Block Diagram

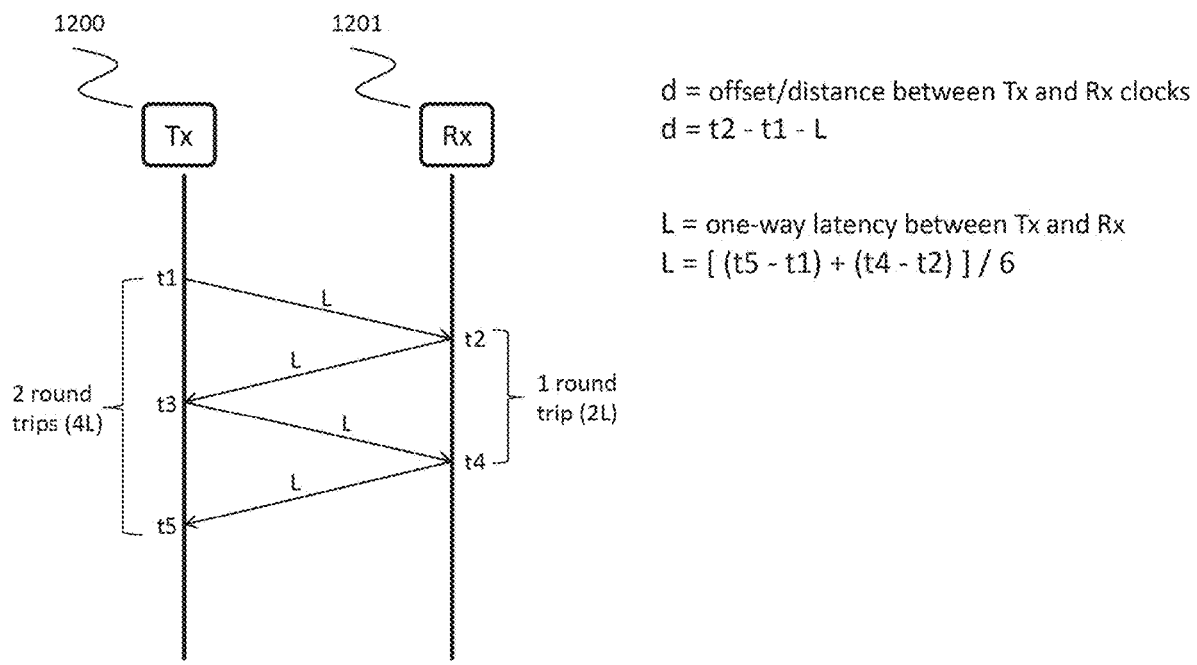
Figure 12. Transmitter/Receiver Clock synchronization Diagram

DEVICE AND METHOD FOR CHARACTERIZATION AND OPTIMIZATION OF MULTIPLE SIMULTANEOUS REAL-TIME DATA CONNECTIONS

CROSS-REFERENCE TO RELATED APPLICATIONS

This application is a continuation of U.S. patent application Ser. No. 16/379,158 filed on Apr. 9, 2019, which is a continuation of U.S. patent application Ser. No. 15/651,050 filed on Jul. 17, 2017 (now U.S. patent Ser. No. 10/298,507), which is a continuation of U.S. patent application Ser. No. 15/142,073 filed on Apr. 29, 2016 (now U.S. Pat. No. 9,736,079), which is a continuation of U.S. patent application Ser. No. 14/360,372, filed on May 23, 2014 (now U.S. Pat. No. 9,357,427), which is a National Stage Entry of PCT Application No. PCT/CA2013/000763, filed Sep. 6, 2013; which claims the benefit of including priority to U.S. Provisional Patent Application No. 61/698,082, filed Sep. 7, 2012. All of these applications are hereby incorporated by reference in their entireties.

FIELD

Embodiments described herein relate to network communications. Embodiments described herein relate more particularly to systems and methods for improving the performance of real time or near real time data communications.

INTRODUCTION

In many real-time data transmission applications, it is desirable to have a pre-determined, maximum end-to-end latency for the transmission of data between capture at the transmitter, and successful delivery of that data to the system(s) connected to the receiver. This end-to-end latency is referred to as "system latency". For example, in the case of real-time video, system latency is defined as the time from video frame capture to the time when that frame is available for playback at the receiver.

Data transmission can be made over wired, wireless (including, but not limited to, satellite networks, microwave networks, and cellular networks) or optical networks. All network types have a time delay between when data is submitted for delivery by the transmitter and when it arrives at the receiver. This time delay is known as "network latency". For some wireless networks there is an empirical relationship between data rate and network latency—as the data rate increases, network latency may also increase proportionately until it reaches a threshold where the latency increase becomes exponential and data loss is guaranteed. In other network types, latency may remain relatively constant as the data rate is increased; however, once the data rate passes a certain threshold, packet loss increases dramatically. Other types of networks have similarly characteristic relationships between data rate, latency, and loss.

Various types of network connections, including but not limited to cellular, WiFi, satellite, microwave, Ethernet or optical fiber connection, may have different characteristics. For the purposes of real-time data transmission, these characteristics include but are not limited to cost to use the connection (typically based on the volume of data transferred), one-way time delay for data transfer from the transmitter to the receiver (the previously defined network latency), maximum supported bit rate and bit error rate (packet loss). Significantly out of order packets can be an indicator of impending packet loss. These characteristics are generally a property of a specific connection type and may vary over time as a result of changing network conditions or other factors (e.g., the changing location of a transmitter). Knowing these characteristics a priori and tracking changes affecting them over time can provide useful information for error correction techniques that may be devised to correct the errors introduced by the connection characteristics themselves or changes in these connection characteristics over time.

A real-time or near real-time data transmission system generally may include a transmitter that sends data over a forward channel to a receiver using one or more simultaneous network connections. For some network configurations, there may also be a reverse channel between the receiver and the transmitter that the receiver can use to send data to the transmitter in an analogous manner. There is no reverse channel in the case of a microwave network. Each of the transmitter and receiver generally contain a controller, a connection manager and error correction logic that is used to control and manage data transmission over the connection or connection(s).

In networks where loss of data packets can occur, it is common for the receiver to detect packet loss (errors) over the forward channel and inform the transmitter over the reverse channel that a packet has been lost and: 1) the packets are re-transmitted from the transmitter to the receiver; or 2) additional error correction data may be generated by the transmitter and sent to the receiver so that a lost or corrupted data packet can be corrected. This error notification and re-transmission increases the system latency because of the time required to communicate the error from the receiver to the transmitter and then re-transmit the required data from the transmitter to the receiver.

In some real-time data transmission applications, it may be necessary to send higher data rates between a transmitter and a receiver than can be delivered by a single network connection of available networks. One approach may bond two or more network connections to deliver a higher, aggregate data rate between the transmitter and receiver. When bonded connections are used, the connections are typically of similar type, resulting in a higher aggregate data rate with similar system latency to the individual connections alone. In general, this approach may also improve the error resiliency of the aggregate connections.

Various solutions exist for improving real-time or near real-time data transmissions over wireless networks. One example of a previously disclosed approach for improving the transfer of time critical data over wireless networks is the Applicant's U.S. patent application Ser. No. 12/499,151 for a "MULTIPATH VIDEO STREAMING OVER A WIRELESS NETWORK". Another technology of the Applicant is discloses solutions for reducing data transmission related packet loss in time critical data transmissions over wireless networks, namely U.S. patent application Ser. No. 13/183, 652 ("Related patents").

In a bonded connection scenario where the bonded connections may have significantly different characteristics, there is a need for a solution that addresses the different connection characteristics in a way that improves data transmission performance intelligently, or at least an alternative. For example, a high network latency, high bandwidth connection, when bonded with a low network latency, lower bandwidth connection can provide a combination that will deliver a higher data rate than either connection could deliver alone along with a system latency that is less than that achievable by the high network latency connection alone. In this scenario, if there is a significant difference between the characteristics of the connections that are bonded, improved performance can be obtained if the transmitter and/or the receiver have knowledge of the specific characteristics of each connection and its role in data transmission.

Similarly, in another example, a high bandwidth unidirectional connection, such as but not limited to microwave, when bonded with a low network latency, lower bandwidth bi-directional connection can provide a combination that may deliver a more efficient use of the unidirectional connection.

Managing data transmissions using connection characteristics such as how these characteristics may change or evolve over time, and how these connections can be synthesized into a bonded set of connections that will deliver improved performance, presents complex, real-time problems. Thus, an improved method for managing data transmission performance based on these variable connection characteristics is required. More specifically, solutions are required that are suitable for real-time or near real-time applications that improve the maximum aggregate data rate (i.e. the data sent over each connection) involving data transmission of relatively large data sets.

SUMMARY

It is therefore desirable to overcome at least one disadvantage of conventional systems and methods for transmission of data signals over a wireless network, or at least provide an alternative.

In one aspect, embodiments described herein may provide a computer implemented system for improving performance of transmission in real-time or near real-time applications from at least one transmitter unit to at least one receiver unit is provided, the system comprising: (A) at least one computer, including one or more processors, being configured to connect to two or more communication networks so as to enable transmission of data from the transmitter unit to the receiver unit; and (B) a data connection manager utility, implemented to or linked to the computer, the data connection manager utility: (i) generating or accessing current performance data for two or more data connections associated with the two or more communication networks, and based on the current performance data determining current network transmission characteristics associated with the two or more data connections; (ii) bonding or aggregating the two or more data connections based on: (1) a predetermined system latency requirement; and (2) dynamically allocating different functions associated with data transmission between the two or more data connections based on their respective current network transmission characteristics; and (iii) dynamically managing the transmission of relatively large data sets across the two or more bonded or aggregated data connections in a way that meets the system latency requirement and improves performance in regards to other network performance criteria (including data transfer rate, errors, and/or packet loss).

In a further aspect of the system, the two or more data connections may include: (A) at least one satellite or microwave or Ethernet connection; and (B) at least one cellular or Ethernet connection.

In a further aspect, the data connection manager utility includes one or more intelligent features for allocating data transmission functions intelligently between the diverse connections in a way that exploits the divergent characteristics intelligently.

In a yet another aspect, the satellite connection A is used to carry content packets, and the cellular connection B that is part of the bonded or aggregated connections carries error control and correction information, such that connection A and connection B compensate for one another and, by allocating functions selectively between them, the data connection manager utility provides better overall performance.

In a still other aspect, the data transmissions enabled by the present invention utilize the relatively high data transfer rates of satellite connections while meeting low latency requirements (without sacrificing content quality) because error control and correction information are transmitted relatively soon by using the cellular connection for this purpose, and thus providing sufficient time to apply correction to the content carried over the satellite connection and still meet the low latency requirements.

In another aspect of the system, data connection manager utility (A) performs an initial dynamic allocation of the functions and (B) continues to monitor for changes in conditions affecting the improvement of performance of data transmission across the available connections, and if (C) such change is detected that meets one or more predetermined parameters, thereby optionally triggering a re-allocation of the functions.

In another aspect, the transmitter unit and the receiver unit are configured to interoperate, so as to achieve bi-directional control of communications for implementing the performance improvements.

In another aspect, the data connection manager utility includes or is linked to a management user interface or dashboard that enables users to interact with one or more manual and/or automated content delivery performance improvement features.

In a further aspect, embodiments described herein may provide a computer implemented method of improving performance of transmission in real-time or near real-time applications from at least one transmitter unit to at least one receiver unit is provided, the method comprising: (A) generating or acquiring from a customer a relatively large data set for transmission from the transmitter unit to the receiver unit; (B) determining or receiving a system latency requirement associated with the transmission of the data set; initiating a data connection manager utility, implemented or linked to at least one computer, the computer including one or more processors and being configured to connect to two or more communication networks so as to enable transmission of data from the transmitter unit to the receiver unit, to: (i) generate or access current performance data for the two or more data connections associated with the two or more communication networks, and based on the current performance data determining current network transmission characteristics associated the two or more data connections; and (ii) bond or aggregate the two or more data connections based on: (1) the predetermined system latency requirement; and (2) dynamically allocating different functions associated with data transmission between the two or more data connections based on their respective current network transmission characteristics; and (C) managing dynamically, using the data connection manager utility, the transmission of the data sets across the two or more bonded or aggregated data connections in a way that meets the system latency requirement and improves performance in regards to other network performance criteria (including data transfer rate, errors, and/or packet loss).

Other aspects and features of the embodiments herein will become apparent to those ordinarily skilled in the art upon review of the following description of specific embodiments in conjunction with the accompanying figures.

BRIEF DESCRIPTION OF FIGURES

Embodiments will now be described, by way of example only, with reference to the attached Figures, wherein:

FIG. 1 illustrates a transmitter (Tx) sending data to a receiver (Rx) over n bonded connections (C1 to Cn) each connection with a latency (L) and a data rate (R);

FIG. 2 shows a graph of system latency versus output error rate for two typical connections, C1 and C2;

FIG. 3 shows a graph that illustrates how bonding connections of differing latency and data rate characteristics can result in an aggregate connection that is capable of an improved system latency compared to the higher latency connection by itself;

FIG. 4 shows a flow chart illustrating how late, corrupted or missing data packets are corrected using packet retransmission;

FIG. 5 shows a table that lists typical characteristics and roles for some example connection types;

FIG. 6 shows an example of connection categorization based on network latency;

FIG. 7a shows an example of categorization of Connections by Latency;

FIG. 7b shows an example of categorization of Connections by Error Rate;

FIG. 8 shows the flow chart illustrating the computation of connection characteristics;

FIG. 9 shows a flow chart illustrating connection categorization modes;

FIG. 10 shows a block diagram of the transmitter;

FIG. 11 shows a block diagram of the receiver; and

FIG. 12 shows an example of synchronizing transmitter and receiver clocks.

DETAILED DESCRIPTION

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. One should appreciate that embodiments described herein may provide computer implemented systems and methods of improving performance of transmission in real-time or near real-time applications.

The following discussion provides many example embodiments. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In one aspect, embodiments described herein may provide a high performance content delivery computer platform (the "platform") is provided. The platform is suited for example to real time or near real time transmission of relatively large data sets—enabling for example transmission of video content via wireless connections to broadcasters in a way that meets their requirements, particularly around low system latency.

Video content may be received as a data stream which may refer the continuous delivery of information, from a data source, to be passed to a receiver. The data source for the data stream may be generated by a data capture device. In the case of an audio or video data stream, the information is typically composed of discrete units known as frames.

A video frame may represent a single image in a series of images required to reconstruct a moving picture. An Audio Frame may be a discrete segment of a continuous audio data stream. Embodiments described herein may divide a continuous audio or video data stream into a stream of fixed length segments, each of which may represent a slice of time. Played back in sequence, the audio or video frames comprise the entire audio or video data stream.

A video stream or video data stream (e.g. video content) may refer to a continuous sequence of video frames, typically presented at one of the industry standard frequencies. A video stream may or may not include an audio stream.

Real-time delivery of data may refer to a data stream that is output from the receiver at the same rate, and at almost the same instant as it was captured from the source or transmitted by the transmitter. There may not be a true instantaneous output of data after transport across the one (or more) connected networks, so real time may refer to near real-time. A near real-time solution may have a delay between capture and subsequent play back. The delay may be fixed for the length of the stream, and may be as short as possible. This delay may also be referred to as latency.

The platform includes or is linked to a network connection bonding or aggregation utility for bonding or aggregating multiple network connections (optionally different types of connections and/or connections associated with different carrier networks). The platform includes a communication interface that may improve the performance of the transmission of relatively large data sets. The communication interface may be linked to a communication management dashboard as described below, enabling users to select between a range of manual and/or automated content delivery performance improvement features disclosed herein. Performance of the network(s) for the platform, system, processes may be evaluated or measured using a variety of mechanisms and metrics. Performance may be referred to as performance data, performance criteria, network performance, performance measurements, performance models, and so on. There are different ways to measure performance of a network, as networks vary in design, function, role, use, environment, implementation, and so on. Illustrative examples of performance measurements may include, but are not limited to, data transfer rate, throughput, bandwidth, jitter, stability, errors, timing, packet loss, cost, measurements like device buffer/queue length and signal-to-noise ratio, measurements specific to wireless/cellular networks, like RSSI, CQI, RSCP, EC/IO, and so on, and measurements specific to satellite like current symbol rate, and son. Performance may also be measured using network characteristics as described herein.

One implementation of the technology improves the performance of transmission of video data for real-time or near real-time transmission, thereby enabling for example live two-way interactive broadcast of video data (enabling for example talkback, not just the live transmission of real-time video).

One contribution of embodiments described herein may involve the discovery and usage of particulars regarding the different characteristics associated with different types of data connections (for example a satellite link as opposed to a cellular link) as it relates to completing simultaneous real-time or near real-time data transfers of relatively large data sets, to the delivery requirements of for example broadcasters. These characteristics may be referred to as connection characteristics, network characteristics, transmission characteristics, and so on. Also, these characteristics can vary from network operator to network operator, and also can vary from location to location from network operator to network operator, and furthermore can vary with the same network operator in around the same location with time. In real time or near real time applications, where data transmission of relatively large data sets is required from different locations at different times, and the network parameters to meet delivery requirements can vary, prior art solutions have not provided a satisfactory solution (based on the requirements of for example, broadcasters), nor is one obvious to those skilled in the art. Various illustrative examples of network characteristics are referred to herein, including, but not limited to, network latency, data rate, packet loss, cost, availability, scalability, security, reliability, topology, bandwidth, various technical properties, protocols, congestion, service, and so on. These may be static, fixed or dynamic. For example, cost may be considered a dynamic characteristic, because it may change as the connection is used. Once a periodic (e.g. monthly) plan allotment on a particular connection is used, the process or technique may be changed to prefer other connections if their performance is equal, or near-equal in view of system requirements. Network characteristics may relate to elements of network performance as described herein, and performance measurements may be used as characteristics in example embodiments.

More particularly, a key requirement for example broadcasters is "system latency" (as previously explained), which depends on "network latency" (also defined above). System latency, or end-to-end latency, may be referred to as Glass to Glass latency. System latency may refer to the time delay between when a data source is captured (at the glass of the camera lens) using a data capture device or equipment and the delivery of the reassembled data stream to the intended receiver. In the simplest case, the receiver could be a directly connected video output.

Improvement of performance of delivery content across multiple networks, especially in real time or near real time applications, requires balancing of different considerations that often compete with one another. Generally speaking, developing content delivery solutions that meet the mentioned delivery requirements generally requires a trade-off between picture quality and latency. This point is detailed further below.

The inventors have discovered that it is desirable (in delivering real time or near real time applications to customers) to prioritize latency more than prior art solutions have typically, or than those skilled in the art have understood. One aspect of embodiments described herein provide systems and methods that (A) receive from a user, or determine, a minimum system latency threshold, and (B) dynamically manage transmission of data across a set of bonded/aggregated connections, depending on applicable network performance parameters, in a way that meets a predetermined system latency threshold.

More particularly, the inventors have discovered that the divergent characteristics of diverse networks can be exploited advantageously, and more specifically so as to achieve a desirable data transfer rate, while meeting predetermined system latency performance requirements, by allocating data transmission functions intelligently between the diverse networks in a way that exploits the divergent characteristics intelligently.

In addition, embodiments described herein may provide a number of different aspects of the platform and related computer implemented methods that may accomplish this result, as detailed below.

As a result, embodiments described herein may enable relatively short latency, while providing improved error resiliency which for video applications may provide better picture quality, that may not be possible based on the prior art, nor was obvious to those skilled in the art considering the prior art.

For example, as detailed below, the present invention enables the bonding or aggregation of at least one satellite link and at least one cellular network link. Embodiments described herein may use diverse links that may be bonded/aggregated in a way that different data transmission tasks are distributed amongst the diverse links, as part of the bonding/aggregation, in a strategic way.

More specifically, as described herein, in accordance with some embodiments, a satellite connection may be used in combination with a cellular connection such that (A) the satellite connection is used to carry content packets (higher data transfer rate but generally higher network latency than cellular connections), and (B) an associated cellular connection (part of the bonded or aggregated connections) carries error control and correction information (lower data transfer rates for relatively large data sets but lower network latency than satellite connections), such that connection (A) and connection (B) compensate for one another and, using the platform to allocate functions selectively between them, thereby permitting better overall performance.

More specifically, this approach may enable the platform to exploit:

(A) the relatively high data transfer rates of satellite connections, while (B) meeting low latency requirements (without sacrificing content quality) because error control and correction information are transmitted sooner (than in prior art solutions) by using the cellular connection for this purpose, and thus providing sufficient time to apply correction to the content carried over the satellite connection, while meeting the low latency requirements. Using prior art solutions, there may be insufficient time to allow for the transmission of error control information for re-transmission of missing or incorrect packets containing the video signal, in one implementation. This may force customers to accept either longer system latency or inferior error resiliency (which for certain applications may result in reduced picture quality). Embodiments described herein may remove this constraint and thereby provide important advantages to customers that may not be possible with prior implementations.

In one aspect, the platform includes a novel and innovative data transmission manager. The data transmission manager is operable to (A) categorize two or more connections (as explained below), and (B) dynamically allocate transmission related tasks across the categorized connections. The reference to "dynamic" allocation may indicate both an initial dynamic allocation, and also possible dynamic re-allocation based on detected changes in conditions affecting the improvement of performance of data transmission across the available connections.

The categorization/allocation by the data transmission manager, in one implementation, results in a set of data transmission parameters that are generated for a particular transmission (including based on parameters associated with the data set to be transferred, and also the current, relevant network performance parameters). The data transmission manager includes intelligent features for updating the data transmission parameters as required, based on for example changing network performance parameters and/or detected errors, as detailed below.

The data transmission manager may implement a decision tree that includes a plurality of logic routines or operations for improvement of performance of real time or near real time data transmission of relatively large data sets. A number of examples of possible logic routines or operations are provided below. These are examples and various other logic routines or operations are possible, and also that the platform may be modified to embody various network performance improvement techniques.

In a particular aspect of embodiments described herein, a novel and innovative data transmission performance improvement architecture is provided wherein a transmission component and a receiver component are provided, and are configured to interoperate, so as to achieve bi-directional control of communications to achieve the desired delivery requirements.

The platform optionally includes an administrative dashboard that enables platform users to access one or more functions and features for managing the transmission of data, in accordance with embodiments described herein. Another contribution of embodiments described herein, may be an administrative dashboard that embodies flexibility in enabling users to manage selection of connections for participation in a data transmission and allocation of data transmission related tasks across the selected connections either (A) manually or (B) automatically.

Embodiments described herein relate to the real-time transmission of data over bonded network connections based on individual connection characteristics. More specifically, there is described a flexible approach for manually or automatically selecting and adjusting the data sent over a set of bonded network connections in real-time, while seeking to provide improved aggregate (bonded) data rate for a pre-determined, end-to-end system latency. In addition, for scenarios where the application's required data rate is less than the available bonded data rate, additional optimizations are employed to minimize the overall cost of the system.

Examples of Implementation

In one example implementation of embodiments described herein, FIG. 1 illustrates a transmitter (100) sending data to a receiver (101) over two or more connections (C1 to Cn —104) each with a network latency of L and a data rate R measured in megabits per second (Mbps). Transmission from the transmitter to the receiver is over the forward channel (105). Transmission from the receiver to the transmitter is over the reverse channel (106). Two or more connections C may be bonded to deliver a higher aggregate data rate and the data rate sent over each connection may be adjusted in real time to deliver improved aggregate data rate for a pre-determined latency. This may be accomplished for example using the techniques disclosed in the Related patents.

The connections C (104) may be of the same type, or they may be of different types, including but not limited to cellular, WiFi, satellite, microwave, Ethernet or optical fiber, and may have different characteristics. These characteristics include but are not limited to network latency, maximum supported bit rate (R) and bit error rate (packet loss). These characteristics are generally a property of a specific connection type and may vary over time as a result of changing network conditions or other factors (e.g., the changing location of a transmitter). If the connections C are of different types, they may have significantly different characteristics that may be known a priori. For example, a satellite connection may have high date rate (30 Mbps) and long network latency (300 ms) compared to a cellular network connection, which may have a lower data rate (1 Mbps) and shorter network latency (100 ms). Alternatively, the characteristics of the connections C may not be known in advance. Given that microwave may be a uni-directional connection C there may be no reverse channel (106) in the case of a microwave network connection.

In the case where the characteristics of the connections C differ significantly, it is possible to provide improved data rate for a pre-determined system latency if the specific characteristics of the connections are exploited advantageously. For example, in one example implementation transmission of an 8 Mbps real-time signal may be performed over a high bandwidth (30 Mbps), long network latency (300 ms) satellite connection in combination with a lower bandwidth (1 Mbps), shorter network latency (100 ms) cellular connection, where improved performance is provided by using the satellite connection as the primary data transmission connection while using the cellular connection for control (i.e. error indication) and error correction (i.e., packet re-transmission).

In this scenario, real-time data packets may be initially sent over the satellite connection. If the satellite connection were used alone (i.e., there is only one connection, C1 and no connection bonding is employed), completing a re-transmission of a lost packet may delay the reception of the packet at the receiver by for example 900 ms: the network latency for the initial transmission (300 ms), plus the network latency for the error to be reported from the receiver to the transmitter (300 ms), plus the network latency for the corrected packet to be sent from the transmitter to the receiver (300 ms). In a real-time data transmission configuration where the target is usually around 1 second system latency, the 900 ms of this example (which is fairly typical) for real-time data transmission including error correction using one packet re-transmission may be unacceptably long and result in a system that would not meet the specified system latency requirements.

If the cellular and satellite connections are used without classification in accordance with embodiments described herein, the system may still be limited by the longest network latency. Each connection may be loaded to its calculated capacity with a combination of live data, control data and repeated packets. For example, if a live frame is sent on the cellular (fast) connection and dropped, the receiver must wait until the sequence number has been missed on the second, satellite connection before it can declare it as lost, since the receiver doesn't know upon which connection the packet was originally sent. As a result, the receiver delays the identification of the missing packet by the longest network latency, and because of limited channel capacity, repeated packets may not be delivered in time to meet a predetermined minimum system latency.

However, if the satellite connection is used in combination with the cellular connection, in accordance with embodiments described herein, the aggregate network latency can be reduced to 500 ms by reporting the error condition (missing packet) and the packet re-transmissions over the cellular connection. With this approach, a latency improvement of two times the network latency difference between the satellite connection and the cellular connection can be realized, assuming that the cellular connection has sufficient bandwidth and a sufficiently low error rate to support the transmission of control information and re-transmission of missing packets. This approach can be generalized to more than two connections by addressing the different resultant characteristics.

An example situation where this approach can be used advantageously is the transmission of real-time video for broadcast. For broadcast applications a known system latency (usually called the "glass-to-glass latency") is generally required. This is a requirement because broadcasters demand known and well-controlled system latencies so they can easily synchronize multiple video signals as well as synchronize video and audio signals. Desired system latencies may be sub 1 second, so that there may be no need to compensate for higher latency. For example in a broadcast video implementation, waiting for 5-10 seconds between a question from a desk anchor and an answer from a reporter in the field is not desirable. The present technology provides an improved mechanism for avoiding such implications of relatively high latency.

As outlined above, if a single satellite connection is used for a real-time video transmission for broadcast, it may not be possible to meet a sub 1 second latency requirement with sufficient video picture quality. This is because given a network latency over the satellite connection of for example 300 ms per transmission there may be insufficient time to allow for the transmission of error control information to permit re-transmission of missing or incorrect packets containing the video signal. Thus, a user may have to accept either longer system latency, or reduced video picture quality.

If a cellular connection with 100 ms latency and satellite connection with 300 ms latency are simply bonded together (for example using a known bonding technique), this may result in a configuration where the system latency is determined by the longest network latency of the bonded connections since the transmitter and the receiver are not using any knowledge about the characteristics of the underlying connections for the transmission of the real-time video stream. Again, a user must therefore accept either a longer latency or reduced picture quality.

However, if the cellular connection and the satellite connection are used in conjunction with one another as outlined herein, with the underlying characteristics of the connections either manually set, automatically determined or updated periodically in real-time, and then used to compensate for one another, a lower system latency (less than 1 second) along with improved video picture quality can be provided because error control and correction information can be sent over the cellular connection with the lower network latency.

To illustrate embodiments described herein, FIG. 2 is a graph (200) showing a schematic illustration of system latency versus error rate for two example connections, C1 and C2. C1 has a network latency of L1 milliseconds (203) and a system latency versus output error rate graph (201). Below a certain system latency, typically three times the network latency L1, the output error rate (unrecoverable errors at the output due to delivery failure) increases significantly. Similarly, C2 has a lower network latency, L2 (204) and a similar system latency versus error rate graph (202).

In an error correction scheme that allows one packet re-transmission to correct missing, corrupted or lost packets, using C1 alone results in a minimum viable system latency of three times L1 milliseconds at the R1 data rate. Similarly, using C2 alone results in a minimum viable system latency of three times L2 at a data rate approaching R2. However, the bonded configuration of C1 and C2 can deliver a combined minimum viable system latency of L1+2*L2 with a data rate approaching R1, by applying the technique of the present invention, where C1 is used for primary data transmission and C2 is used for error indication (control) and transmission of error correcting packets, provided that the data rate for error indication and correction does not exceed R2.

FIG. 3 shows a schematic illustration (300) of the system latency versus corrected error rate for one packet re-transmission for the bonded configuration of C1 and C2, indicated at (C1,C2). As noted above, the system latency is now L1+2*L2 (304).

These techniques can be readily extended to account for additional packet re-transmissions (see for example FIG. 4) with increased system latency and bonding of multiple connections where the connections play different roles based on their characteristics. FIG. 4 shows how error correction is accomplished via packet re-transmission. A packet is missing if it is never received by the receiver. The receiver is able to detect missing packets using identification information that accompanies each packet. Various techniques for detection of missing packets are known in the art. Late packets may be detected by comparing the time since a packet was sent versus the current estimate of the average network latency for a specific connection (Cn) on which the packet was sent. If the time since a packet was sent exceeds the estimated average network latency by a preset threshold, the packet is deemed late and a request for re-transmission will be sent to the transmitter by the receiver over the reverse channel. Alternately, if the receiver does not know which connection (Cn) originally transmitted the missing packet, it can continuously (i.e. on some interval) report the list of missing packets to the transmitter, and using the same logic described above, the transmitter can decide when a packet is considered late and initiate the re-transmission.

In another aspect of embodiments described herein, detection of missing or late packets is further improved by configuring the system so that the transmitter informs the receiver about how it has characterized a specific connection (Cn). For example, in the case of one satellite and one cellular connection, if the receiver knows that the transmitter has characterized them as such, it knows that it should only expect primary data on the satellite connection and only retransmitted packets on the cellular connection. Therefore if the receiver observes a gap in the packet sequence numbers received on the satellite connection, it can report the packet as late or missing with a greater degree of confidence since it knows that the gap is for example not due to the packet still being in transit on the cellular connection.

FIG. 5 shows a table listing typical characteristics for some example connections. Based on the specific characteristics of the connections, they are categorized into roles or functions, such as being used for either "Primary Data Transmission", "Control and Error Correction" or both of these roles or functions. These are illustrative non-limiting examples of roles or functions associated with data transmission. Other examples include, secondary data transmission or redundant transmission, secure transmission, and so on. The "primary data transmission" role could be further split based on the capacity/reliability of the connections. For example, a highly reliable but low bandwidth connection might be ideal to be the primary connection for audio packets. There may be a "generic" role or function, e.g. in the case where the connections are similar enough that they are all treated the same so they may all carry primary data and control/error correction. Various other roles or functions may also be used depending on the characteristics of the connections and the requirements of the system.

In the case where connection characteristics are known a priori and are unlikely to change over time during use, this information can be entered by the user either as connection characteristics or as a connection role for each of the connections in the bonded group of connections. For the satellite and cellular example above, the satellite connection would be manually set as the primary data transmission connection and the cellular connection would be assigned the role of control and error correction.

If the connection characteristics are not known in advance, automatic detection and categorization of these characteristics may be used to discover the connection characteristics. In another aspect of embodiments described herein, where the connection conditions are likely to change this may also be combined with real-time monitoring of the characteristics for each connection to ensure that the connection delivers improved data rate for a pre-determined system latency under changing connection conditions. If for example the connection characteristics change and stabilize in a new state, the connection may be re-categorized. If the connections are changing and do not stabilize, a connection may be categorized as variable. Embodiments described herein may use various technologies for monitoring the characteristics of connections, which are well known in the art.

Automatic characterization is also useful where the connection type is made with a physical interface that can apply to multiple connection types. For example, a satellite connection may be made to the transmitter with an Ethernet cable. In this scenario, automatic characterization of the connection can detect the difference between a satellite connection which has 300 ms typical network latency and varying packet loss depending on weather conditions (for example) and a wired IP connection that may have typical network latency of only 10 ms and almost no packet loss.

Some connection characteristics such as cost require a hybrid approach. In some cases the current cost per unit volume of data can be queried from an authoritative third party such as the connection's service provider. In other cases the cost per unit volume might be based on a set of rules, and thus can be entered in the transmitter a priori.

Another case exemplifying the benefits of a hybrid approach may involve a uni-directional microwave network, where the marginal cost of transmission is negligible, but the sunk cost of creating the private bandwidth microwave network is substantial. Pairing such a network with a more expensive (per-transmission) bi-directional cell connection, allows the microwave network operator to over subscribe the microwave connection, allowing more transmissions to take place over that fixed-bandwidth link. This is possible as the second low latency link may be used to transmit error information back to the transmitter, which may not be possible using the uni-directional network. Methods, such as forward error correction, may be used in a uni-directional network situation to handle transmission errors, but that such methods require additional bandwidth in order to send the content plus the error correcting codes. By providing an alternate method of error correction that avoids use of the microwave network, embodiments described herein thereby reduce the bandwidth usage on the microwave network.

Additionally, with forward error correction on a uni-directional microwave network, both the video bitrate and the percentage of recovery data to be generated and sent need to be chosen in advance of the transmission, as feedback may not be possible through the uni-directional channel. If the actual percentage of lost data is greater than the anticipated percentage of lost data, then the recovery data may be inadequate, leading to a reduction in the quality of the transmission. Embodiments described herein, by bonding the uni-directional network with a bi-directional network, may allow for feedback to the transmitter, which creates the possibility to do any combination of 1) sending more forward error correcting data in cases where the percentage of data loss is higher than anticipated, 2) retransmitting any missing data that the forward error correction recovery data is not able to supply, 3) reducing the amount of future data generated, such as modifying the video bitrate being transmitted.

An illustrative example of how a connection can be categorized in connection with embodiments described is shown in FIG. 6. Additional or alternative categorizations may be used. The network latency over time for a connection (600) can be computed using for example a running average (or similar statistic) of the measured network latency. The relationship of network latency to data rate may be recorded for each of the connections within a bonded group of connections. For each connection, this data can be split into regions of for example "high" (603), "medium" (602) and "low" (601). Using statistical techniques or other suitable techniques, the network latency for each connection can be categorized into one of these three categories or optionally a fourth category, namely "variable". Similar categorizations may be made for example for error rate (packet loss) and other key connection characteristics.

Then, in accordance with aspects of embodiments described herein, the combination of these characteristics can be employed to multi-dimensionally categorize a connection into a category where all the connections in the category have similar characteristics. This may use combining techniques.

For simplicity, FIGS. 7a and 7b show two possible characterizations based on the measured relationships. These relationships are combined using combining techniques and used to create a multi-dimensional categorization of connections. Based on the multi-dimensional categorization, the role for each connection within the bonded set of connections is assigned.

FIG. 8 shows a flow chart illustrating how connection characteristics can be computed. Time stamped data packets may be sent from the transmitter to the receiver over the forward channel. This data is received by the Receiver and based on (i) the time stamps, (ii) the number packets that are correctly received and (iii) the number of out of order packets, statistics for the connection characteristics are computed. These statistics are computed on a running basis and sent by the receiver to the transmitter over the reverse channel every "t" seconds, where "t" is proportional to the measured latency of the specific connection. Based on these statistics the transmitter will adjust its performance (for example, adjusting the data rate over a particular channel) and monitor the categorization and role of a specific connection within the bonded group of connections.

In one particular implementation of embodiments described herein, three connection characterization and categorization modes may be used. FIG. 9 shows how these modes may operate as an illustrative example. A first "manual mode" may allow the user to enter connection characteristics and/or connection roles (categorizations) for each connection in the bonded set. A second "discover mode" may allow the user to run a one-time characterization and categorization of each connection in the bonded set as per FIG. 8 and save this information for use with the current real-time data transmission session and future sessions. Finally, a third "real-time tracking mode" initiates on-going characterization and categorization of selected or all connections within the bonded set of connections and updates connection characterization and if necessary categorization (and hence role) on a regular interval T or when there is a significant change in connection characteristics. In one implementation these modes may be implemented as features of the administrative dashboard referred to above.

FIG. 10 shows a block diagram of a representative transmitter (1000) that implements the functionality of embodiments described herein. The transmitter (1000) may consist of a connection manager (1001), a controller (1003) and error connection logic (1004). All incoming and outgoing data connections (C1 to Cn, 1002) may be controlled by the connection manager (1001). All incoming data may be received by the input data port (1005). In operation, the connection manager (1001) assesses whether a given connection (Cn) is active. If the connection is active, the connection manager (1001) signals the controller (1003) that the connection is available for use. The state of a connection (active or inactive) is managed in real-time by the connection manager (1001) and signaled to the controller (1003) so that appropriate action can be taken should a connection status change state.

Data from the input port (1005) may be sent to the controller (1003). Based on manual settings entered by the user; the one-time characterization (either computed or loaded from a saved configuration); or a real-time measurement of the characteristics of each connection (Cn) as per FIG. 9, the controller may assign a role to the connection as described above. Then, data from the input port (1005), along with data from the error correction logic is sent over the forward channel using connections that have been categorized for primary data transmission. Any available forward channel bandwidth from connections categorized as error control and correction may also be used to realize the target bit rate for data transmission if the bandwidth is not needed for error control and correction data transmission.

Connections that have been assigned the role of error control and correction by the controller will receive error correction and control data transmitted from the receiver over the reverse channel and supply this information to the controller (1003) and error correction logic (1004). Using this information, error correction logic (1004) may supply error control and correction data to the controller (1003) and the controller will send this data over one or more connections (Cn) that have been assigned the role of error control and correction. For additional redundancy this data may also be sent over connections that have been assigned the role of primary data transmission. Ongoing connection statistics may also received by the transmitter from the receiver over the reverse channel.

FIG. 11 shows a block diagram of the receiver (1100). The receiver (1100) consists of a connection manager (1101), a controller (1103) and error connection logic (1104). All incoming and outgoing data connections (C1 to Cn, 1102) are managed by the connection manager (1101). All outgoing data is sent via the output data port (1105). In operation, the connection manager (1101) assesses whether a given connection (Cn) is active. If the connection is active, the connection manager (1101) signals the controller (1103) that the connection is available for use. The state of a connection (active or inactive) is managed in real-time by the connection manager (1101) and signaled to the controller (1103) so that appropriate action can be taken should a connection status change state. In an alternative embodiment of the receiver, the connection manager (1101) may be absent and the transmitter (1000) will send connection status information (active or inactive) via C1 to Cn that are in an active state. The transmitter may also send the connection role information to the receiver over the forward channel, which can aid the receiver in determining when to report a packet as missing or late.

Data sent from the transmitter (1000) is received over the active connections (01 to Cn) of the receiver (1100). This data may consist of real-time data that will be sent to the output port (1105), including error correction and control data and connection role information. Data sent from the receiver (1100) to the transmitter (1000) may consist of error correction and control information and statistics on connection characteristics. The controller may re-aggregate the data based on the role of the connection (C1 to Cn) and uses the error correction logic (1104) to detect missing, late or corrupted packets. Requests for re-transmissions of missing, late or corrupted packets may be sent by the controller (1103) through the connection manager (1101) over the connections that have been assigned to the error control and correction role. If sufficient bandwidth is available on C1 to Cn, requests for re-transmission may also be sent over connections that have been assigned the role of primary data transmission for improved redundancy.

Synchronization

In one particular aspect of embodiments described herein, to ensure accurate measurement of one-way latency, the clocks at the receiver and the transmitter may be synchronized. In accordance with embodiments described herein, synchronization may be accomplished by calculating the offset (distance) between the transmitter and receiver clock. FIG. 12 illustrates how this distance may be calculated. Transmitter (1200) stamps a packet with its local time (t1) and sends it to the receiver (1201), which also stamps the packet with its local time (t2). The distance (d) between the two clocks is the difference between t1 and t2, minus the one-way latency (L) between transmitter (1200) and receiver (1201). To calculate L, the average round-trip transit time between the transmitter and receiver is measured by sending time stamped data packets over the forward channel from the transmitter to the receiver and over the reverse channel from the receiver to the transmitter. A large number of re-transmissions may be used to ensure a statistically accurate measurement. Once a sufficiently large number of re-transmissions has been made, the average one-way latency (L) is estimated as:

$$L = \text{(total difference in time)}/\text{(number of one-way trips)}$$

Once the distance (d) between the transmitter (1200) and receiver (1201) clocks is known, the clocks are synchronized because timestamps generated by one side can be easily converted to timestamps generated by the other side.

Independent clocks do not necessarily record the passage of time at precisely the same rate. Therefore the distance (d) calculated between the transmitter (1200) and receiver (1201) clocks may change over time (clock drift). If the drift is close to the resolution required for measuring one-way network latency, the measurements will not be accurate and as a result the connections may not be characterized correctly. To account for clock drift, consecutive distance (d) measurements are calculated at fixed intervals, and an average velocity can then be calculated. The transmitter and receiver use the average velocity to independently adjust the distance (d) over time, keeping the clocks synchronized without the need for explicit communication. This technique can be further extended to higher order derivatives (e.g. acceleration) as required.

Other techniques may be used for monitoring and accounting for clock drift between points such as the known "Flooding time protocol", or the "Precision Time Protocol".

Use of Padding

In another aspect of embodiments described herein, padding may be adapted for use in conjunction with the technique of embodiments described herein.

In the one-time characterization mode (see FIG. 8 and FIG. 9), it may also be useful to set the amount of data rate headroom (padding) that is required on each active connection. Padding is data in addition to the input data stream; error correction and control data; and other control data that is sent by transmitter controller (1003). Padding may serve two purposes, for example: (1) on many networks it is necessary to constantly occupy shared data rate to ensure that this additional data rate is available when requested from the network; and (2) to ensure that sufficient additional data rate is available to meet demand when the characteristics of one or more other connections are unable to meet the required latency, packet loss, or data rate requirements, or the connection becomes inactive.

For connections that are high bandwidth and/or low latency, but have high, uniform loss, the amount of padding sent on the other connections can be adaptively adjusted during the one-time characterization mode and also during real-time tracking mode to compensate for the expected loss. This adaptation ensures that the data rate is reserved on the network and that sufficient data rate headroom will be available when demanded by the transmitter (1000).

In another embodiment, probing all connections to their maximum data rate using padding or actual real-time data during one-time characterization or periodically in real-time tracking mode provides an estimate of the upper limit for the data rate that can be achieved for a pre-determined system latency on each connection in the bonded set of connections. This approach may be used to handle connections with periodic burst errors that result in significant data loss for some period of time, but shows minimal to no loss at all other times. When a burst error event occurs, knowing the upper limits of the other probed connections means that they can be quickly ramped up to compensate, and a consistent aggregate data rate may be maintained on the bonded set of connections. This approach may be useful for example on cellular connections when "bursty" loss events with significant data loss occur and the other connections are required to immediately maintain the aggregate data rate.

Both approaches that are used for uniform loss and burst errors may also be used when each connection in the set of bonded connections has a different cost, and the goal is overall cost minimization of the system. For example, an inexpensive or free connection that has been characterized as having high uniform loss or frequent burst errors may still be used for the role of primary data transmission. The more expensive but more reliable connections in the bonded set would be padded or probed as previously described to compensate, maintaining a consistent aggregate data rate and average end-to-end network latency.

Advantages

Various advantages of embodiments described herein are discussed above. Embodiments described herein may be further understood by reference to illustrative and non-limiting examples of the advantages, including:

(a) An easy to implement system and method for improving performance of time sensitive wireless data transmission of relatively large data sets.

(b) A system and method of bonding data connections for real-time data transmission that can meet pre-determined system latency requirements.

(c) A system and method that also provides increased aggregate data rate and improved error resiliency.

(d) A system and method where the differing characteristics of individual connections are used to compensate for each other either statically or dynamically in real-time.

(e) A system and method that enables the characterization of connections and tracking changing characteristics (that affect the connection) in real-time.

(f) A system and method that improves data transmission over a variety of types of networks by enabling different characteristics associated with at least two networks to be utilized in a more advantageous way.

(g) A system and method that enables the automated categorization of connection, using characteristics associated with the connection, so as to generate data determining the role that each such connection shall play in a bonded connection.

(h) A system and method that includes one or more utilities or tools that allows users to manage the characterization and use of the connections in a user friendly way.

(i) A system and method that significantly improves the ability of customers to distribute and consume content in new ways based on improved ability to transfer large data sets from many different locations in a way that meets real-time or near real-time requirements, as well as data quality requirements.

(j) A system and method that enables: manual or automated categorization of connections; bonding of these connections for real-time data transmission; and optional real-time tracking of individual connections within a set of bonded connections with the aim of providing improved data rate for a pre-determined system latency.

Other Implementations

Embodiments described herein may be implemented in a number of different ways. As an illustrative example, the system may be implemented as an application that interoperates with the network layers of a carrier network. The techniques described in relation to various embodiments may also be implemented in the network layers, for example with the participation of carrier networks. For example a network manager, used by a carrier network to manage wireless network operations, may be configured to implement the techniques of the present invention, or may integrate an application that embodies these techniques. A transmitter and/or receiver may be designed, configured, and/or built to enable the functionality described. The computer system may be implemented for example as a computer implemented network gateway that is configured to connect to two or more networks and enable the managed data transmission paths described in this disclosure, to improve performance.

Techniques to improve performance, and meet other objectives such as reduced cost, as described in this disclosure, may also be used in conjunction with various other systems and techniques for enabling performance improvements and such other objectives.

The invention claimed is:

1. A network interface connection manager device comprising:
   at least one computer, including one or more processors, being configured to connect to two or more communication networks so as to enable transmission of data from at least one transmitter unit to at least one receiver unit, wherein the one or more processors are configured to:
   generate or access performance data for two or more data connections associated with the two or more communication networks, and based on the performance data, determining network characteristics associated with the two or more data connections;
   bond or aggregate the two or more data connections;
   dynamically manage the transmission of data sets across the two or more bonded or aggregated data connections;
   wherein the two of more data connections comprise diverse networks, and wherein the network transmission characteristics of the two of more data connections comprise differing characteristics, wherein the data connection manager utility allocates data transmission functions between the diverse networks such that at least one of the two or more data connections is allocated an error control function, the selection of the at least one of the two or more data connections based at least on the differing characteristics of the two of more data connections.

2. The network interface connection manager device of claim 1, wherein managing the transmission of data sets across the two or more bonded or aggregated data connections includes managing the transmission of data sets across the two or more bonded or aggregated data connections to meet a network latency requirement.

3. The network interface connection manager device of claim 1, wherein managing the transmission of data sets across the two or more bonded or aggregated data connections includes managing the transmission of data sets across the two or more bonded or aggregated data connections to improve performance in regards to network performance criteria.

4. The network interface connection manager device of claim 1, wherein the two or more data connections includes a first group of data connections, the first group of data connections having a higher reliability or a lower latency and a second group of data connections, the second group of data connections having a lower reliability or a higher latency.

5. The network interface connection manager device of claim 4, wherein the first group of data connections is allocated error management functions, and the second group of data connections is allocated content transmission functions.

6. The network interface connection manager device of claim 5, wherein the error management functions provided by the first group of data connections and the second group of data connections in cooperation provides an improved minimum viable latency.

7. The network interface connection manager device of claim 4, wherein the data connection manager utility is further configured for detecting unsuccessfully transmitted packets resulting from the transmission of data; and for reporting a list of unsuccessfully transmitted packets through the second group of data connections.

8. The network interface connection manager device of claim 1, wherein the two or more data connections includes a uni-directional data connection, and the uni-directional data connection is used for error management functions.

9. The network interface connection manager device of claim 1, wherein network characteristics are determined based on at least one of (i) time stamps, (ii) a number of packets that are correctly received, (iii) a number of out of order packets, (iv) a transmission cost, and (v) latency.

10. The network interface connection manager device of claim 1, wherein the data connection manager utility is configured for operation in one or more modes, each mode of the one or more modes providing for entering of connection characteristic data, automated discovering of stored connection characteristic data, or tracking of real-time connection characteristic data.

11. The network interface connection manager device of claim 1, wherein one or more clocks of the data connection manager utility are synchronized with one another.

12. A computer implemented method for providing a data connection manager utility, the method comprising:
   generating or accessing, performance data for the two or more data connections associated with the two or more communication networks, and based on the performance data determining network transmission characteristics associated the two or more data connections; and
   bonding or aggregating, the two or more data connections; and
   allocating different functions associated with data transmission between the two or more data connections based on their respective network transmission characteristics; and
   dynamically managing, the transmission of the data sets across the two or more bonded or aggregated data;
   wherein the two of more data connections comprise diverse networks, and wherein the network transmission characteristics of the two of more data connections comprise differing characteristics; and
   allocating, using the data connection manager utility, data transmission functions between the diverse networks such that at least one of the two or more data connections is allocated an error control function, the selection of the at least one of the two or more data connections based at least on the differing characteristics of the two of more data connections.

13. The method of claim 12, wherein managing the transmission of data sets across the two or more bonded or aggregated data connections includes managing the transmission of data sets across the two or more bonded or aggregated data connections to meet a network latency requirement.

14. The method of claim 12, wherein managing the transmission of data sets across the two or more bonded or aggregated data connections includes managing the transmission of data sets across the two or more bonded or aggregated data connections to improve performance in regards to network performance criteria.

15. The method of claim 12, wherein the two or more data connections includes a first group of data connections, the first group of data connections having a higher reliability or a lower latency and a second group of data connections, the second group of data connections having a lower reliability or a higher latency.

16. The method of claim 15, wherein the first group of data connections is allocated error management functions, and the second group of data connections is allocated content transmission functions.

17. The method of claim 16, further comprising detecting unsuccessfully transmitted packets resulting from the transmission of data; and reporting a list of unsuccessfully transmitted packets through the second group of data connections.

18. The method of claim 12, wherein the two or more data connections includes a uni-directional data connection, and the uni-directional data connection is used for error management functions.

19. The method of claim 12, wherein one or more clocks of the data connection manager utility are synchronized using at least a determination of a round-trip transmit time between the transmitter unit and the receiver unit using time-stamped data packets.

20. A non-transitory computer-readable medium storing machine-interpretable instructions, the machine-interpretable instructions, when executed by a processor coupled to a data storage, cause the processor perform a method for providing a a data connection manager utility, the method comprising:
generating or accessing, using a data connection manager utility, performance data for the two or more data connections associated with the two or more communication networks, and based on the performance data determining network transmission characteristics associated the two or more data connections; and
bonding or aggregating, the two or more data connections; dynamically managing, the transmission of the data sets across the two or more bonded or aggregated data;
wherein the two of more data connections comprise diverse networks, and wherein the network transmission characteristics of the two of more data connections comprise differing characteristics; and
allocating, data transmission functions between the diverse networks such that at least one of the two or more data connections is allocated an error control function, the selection of the at least one of the two or more data connections based at least on the differing characteristics of the two of more data connections.

* * * * *